(12) United States Patent
Takatsu et al.

(10) Patent No.: US 7,905,607 B2
(45) Date of Patent: Mar. 15, 2011

(54) PROJECTOR AND KEYSTONE DISTORTION CORRECTION METHOD FOR PROJECTOR

(75) Inventors: Susumu Takatsu, Shiojiri (JP);
Nobuyuki Otsuki, Matsumoto (JP);
Hirohisa Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 11/862,892

(22) Filed: Sep. 27, 2007

(65) Prior Publication Data

US 2008/0079907 A1 Apr. 3, 2008

(30) Foreign Application Priority Data

Sep. 29, 2006 (JP) ................................. 2006-267941

(51) Int. Cl.
*G03B 21/14* (2006.01)
(52) U.S. Cl. ............................................ 353/70; 353/69
(58) Field of Classification Search .................... 353/69, 353/70, 99, 100, 101, 122; 338/160, 161, 338/162
See application file for complete search history.

(56) References Cited

U.S. PATENT DOCUMENTS

| | | | |
|---|---|---|---|
| 4,479,107 A | 10/1984 | Bleeke | |
| 5,641,957 A * | 6/1997 | Chae | 250/231.14 |
| 5,720,539 A * | 2/1998 | Woo | 353/69 |
| 6,302,543 B1 * | 10/2001 | Arai et al. | 353/70 |
| 6,481,855 B2 * | 11/2002 | Oehler | 353/70 |
| 6,974,217 B2 * | 12/2005 | Kimura et al. | 353/69 |
| 7,029,125 B2 * | 4/2006 | Wu | 353/69 |
| 7,092,045 B2 * | 8/2006 | Haruna et al. | 348/745 |
| 7,494,229 B2 * | 2/2009 | Miyasaka | 353/101 |
| 2002/0093627 A1 * | 7/2002 | Oehler | 353/69 |
| 2005/0001993 A1 * | 1/2005 | Wu | 353/70 |
| 2005/0117129 A1 | 6/2005 | Ishino | |

FOREIGN PATENT DOCUMENTS

| | | |
|---|---|---|
| EP | 0 783 132 A1 | 7/1997 |
| JP | A-7-312305 | 11/1995 |
| JP | A 8-9306 | 1/1996 |
| JP | A 2000-122617 | 4/2000 |
| JP | A-2000-306709 | 11/2000 |
| JP | A 2003-283963 | 10/2003 |
| JP | A 2005-148613 | 6/2005 |

\* cited by examiner

*Primary Examiner* — Georgia Y Epps
*Assistant Examiner* — Bao-Luan Le
(74) *Attorney, Agent, or Firm* — Oliff & Berridge, PLC

(57) ABSTRACT

A projector includes an adjusting leg section configured to be capable of protruding/retracting outside/inside an exterior chassis and changing a tilt condition of the projector, an interlocking device that displaces based on the protruding/retracting movement of the adjusting leg section, a variable resistance device that has a resistance that varies based on displacement of the interlocking device, a voltage detection device that detects a voltage based on the resistance of the variable resistance device, a storage device that stores keystone distortion correction amount information, and a keystone distortion correction device that obtains a keystone distortion correction amount from the keystone distortion correction amount information based on the voltage detected by the voltage detection device, and that corrects the keystone distortion of the projection image using the keystone distortion correction amount.

2 Claims, 17 Drawing Sheets

PROJECTOR AND KEYSTONE DISTORTION CORRECTION METHOD FOR PROJECTOR

CROSS-REFERENCE TO RELATED APPLICATION

This application claims priority from Japanese Patent Application No. 2006-267941 filed in the Japanese Patent Office on Sep. 29, 2006, the disclosure of which is incorporated herein by reference in its entirety.

BACKGROUND

1. Technical Field

Embodiments of the present invention relate to a projector and a keystone distortion correction method for a projector.

2. Related Art

In a projector, the tilt of the chassis in the installation condition causes a keystone distortion in the projected image. Although such a keystone distortion has been corrected by the user with button operations, automated correction methods have gradually been adopted in recent years.

For example, there has been known a method of installing a range sensor for measuring the distance between the projector and the screen in the projector, detecting the tilt angle of the projector with respect to the screen based on an output of the range sensor, and correcting the keystone distortion in accordance with the tilt angle (see, e.g., JP-A-2000-122617).

Further, there has also been known a method of providing an acceleration sensor inside the projector to detect the tilt of the projector, and thus performing the keystone distortion correction of the projection image (see, e.g., JP-A-2003-283963).

However, according to these methods, an expensive component such as a range sensor or an acceleration sensor needs to be incorporated therein, and a problem of increase in cost arises. Therefore, particularly in projectors, it is difficult for low price popularization models to incorporate it from a viewpoint of cost, and accordingly, a problem arises that the automated keystone distortion correction function (auto keystone function) can hardly be implemented in popularization models.

SUMMARY

Some embodiments of the invention include a projector and a keystone distortion correction method for a projector capable of automatically performing the keystone distortion correction at an easy rate.

According to an embodiment of the invention, there is provided a projector for modulating a light beam emitted from a light source in accordance with image information and for enlargedly projecting the modulated light beam, includes an adjusting leg section configured to be capable of protruding/retracting outside/inside an exterior chassis and for changing a tilt condition of the projector, an interlocking device displacing in conjunction with the protruding/retracting movement of the adjusting leg section, a variable resistance device having a resistance varying in accordance with the displacement of the interlocking device, a voltage detection device for detecting a voltage varying in accordance with the resistance of the variable resistance device, a storage device for storing keystone distortion correction amount information representing a relationship between the voltage detected by the voltage detection device and the keystone distortion correction amount of the projection image, and a keystone distortion correction device for obtaining a keystone distortion correction amount from the keystone distortion correction amount information based on the voltage detected by the voltage detection device, and for correcting the keystone distortion of the projection image using the keystone distortion correction amount.

According to an embodiment, when the interlocking device displaces in conjunction with the protruding/retracting movement of the adjusting leg section (foot), the resistance of the variable resistance device varies. Therefore, the voltage detected by the voltage detection device varies in conjunction with the protruding/retracting movement of the adjusting leg section. Then, since the relationship between the protruding/retracting amount of the adjusting leg section, namely the tilt condition (angle) of the projector and the keystone distortion correction amount of the projection image can previously be obtained, and the relationship between the voltage and the protruding/retracting amount of the adjusting leg section can also be previously figured out, it is possible to previously obtain the keystone distortion correction amount information representing the relationship between the voltage and the keystone distortion correction amount, and to store the information on the storage device.

Therefore, the keystone distortion correction device can obtain the keystone distortion correction amount of the projection image based on the voltage detected by the voltage detection device by looking up the keystone distortion correction amount information, and further automatically correct the keystone distortion of the projection image using the correction amount.

Further, since the interlocking device can be composed of inexpensive components such as a frame and a spring, and the variable resistance device is also less expensive in comparison with a range sensor or an acceleration sensor, the keystone distortion correction can automatically be performed at a low price in the projector. Therefore, the auto keystone function can be implemented even in low price popularization models, the adjustment work in installing the projector can be made easier, and the user-friendliness can be enhanced.

Further, since it is arranged that the protruding/retracting movement of the adjusting leg section is converted into the displacement of the interlocking device, and the resistance of the variable resistance device is varied in accordance with the displacement of the interlocking device, there is no need for providing the configuration for varying the resistance of the variable resistance device such as the sliding brush to the adjusting leg section, but it can only be provided to the side of the interlocking device. Therefore, the existing members can directly be used as the adjusting leg section, and the cost can also be reduced in comparison with the case in which a special adjusting leg section is used. In particular, there are many cases in which the outer peripheral surface of the adjusting leg section is provided with a thread for fine-adjustment, and in such cases, it is difficult to provide the configuration for varying the resistance of the variable resistance device such as the sliding brush to the adjusting leg section provided with the thread. In contrast, since in this embodiment, such a configuration can be provided to the side of the interlocking device, it can be applied even in the case in which the thread is formed on the outer peripheral surface of the adjusting leg section, thus high versatility can be obtained.

In the above embodiment, it is preferable that the interlocking device includes a frame disposed inside the exterior chassis rotatably around a pivot, and rotating in conjunction with the protruding/retracting movement of the adjusting leg section, the variable resistance device includes a board fixed inside the exterior chassis, and provided with a conductive pattern, and a sliding brush attached to the frame and sliding on the conductive pattern of the board in accordance with the rotation of the frame, and the conductive pattern is varied in the resistance in accordance with the position of the sliding brush on the conductive pattern.

According to this embodiment, when the adjusting leg section protrudes/retracts, the frame of the interlocking device rotates, and the sliding brush provided to the frame moves on the conductive patterns. Since the conductive patterns are configured so that the resistance varies in accordance with the position of the sliding brush, the protruding/retracting amount of the adjusting leg section, namely the tilt condition of the projector, can be detected with the voltage detected by the voltage detection device, thus the keystone distortion correction amount can be obtained. Therefore, the keystone distortion correction of the projection image can automatically be performed.

Further, since the rotating frame is used, by, for example, arbitrarily arranging the distance from the pivot of the frame to the position where the frame abuts on the adjusting leg section and the distance from the pivot to the sliding brush, the proportion of the movement amount of the sliding brush to the movement amount of the adjusting leg section can be set.

Therefore, by arranging that the movement amount of the sliding brush is small in comparison with the movement amount of the adjusting leg section, the conductive patters can be shortened, and the board on which the conductive patterns are formed can also be downsized. Accordingly, the space required for disposing the board can also be shrunk to realize space saving, and further, the cost of the board having a reduced size can also be reduced.

Further, in the case in which the movement amount of the sliding brush is small in comparison with the movement amount of the adjusting leg section, even if the backlash is caused in the adjusting leg section by the influence of the thread for fine-adjustment, the sliding brush is hardly displaced, thus the influence of the "backlash" in the adjusting leg section can be absorbed. Therefore, the resistance of the variable resistance device, namely the voltage detected by the voltage detection device, can be stabilized, thus the keystone distortion correction amount determined in accordance with the voltage can be set to be a stable value, thereby reliably and stably performing the keystone distortion correction process.

On the other hand, in the case in which the movement amount of the sliding brush is set larger in comparison with the movement amount of the adjusting leg section, if the movement amount of the adjusting leg section is small, the resistance of the variable resistance device, namely the voltage detected by the voltage detection device, can vary dynamically. Therefore, even when the movement amount of the adjusting leg section is small, the keystone distortion correction process can be performed with high accuracy.

In the above embodiment, it is preferable that the interlocking device includes a guide member disposed inside the exterior chassis and parallel to a protruding/retracting direction of the adjusting leg section, and a frame guided by the guide member and moved in conjunction with the protruding/retracting movement of the adjusting leg section, and the variable resistance device includes a board fixed inside the exterior chassis, and provided with a conductive pattern, and a sliding brush attached to the frame and sliding on the conductive pattern of the board in accordance with the movement of the frame, and the conductive pattern is varied in the resistance in accordance with the position of the sliding brush on the conductive pattern.

According to this embodiment, when the adjusting leg section protrudes/retracts, the frame of the interlocking device moves back and forth while guided by the guide member, and the sliding brush provided to the frame moves on the conductive patterns. Since the conductive patterns are configured so that the resistance varies in accordance with the position of the sliding brush, the protruding/retracting amount of the adjusting leg section, namely the tilt condition of the projector, can be detected with the voltage detected by the voltage detection device, thus the keystone distortion correction amount can be obtained. Therefore, the keystone distortion correction of the projection image can automatically be performed.

Further, since the frame is moved back and forth in the same direction as that of the adjusting leg section, the board on which the conductive pattern is formed can be disposed closer to the adjusting leg section in comparison with the case of using the rotating frame. Thus, it becomes possible to configure the adjusting leg section, the frame, the guide member, the board, and so on as an integrated component, and accordingly, the mounting operation inside the projector can easily be performed.

Further, since the adjusting leg section and the frame are the same in amount of movement, by measuring the amount of movement of the frame and the amount of variation of the resistance, the relationship between the amount of movement of the adjusting leg section and the amount of variation of the resistance can directly be obtained, thus the relationship between the voltage and the keystone distortion correction amount can easily be obtained.

In the above embodiment, it is preferable that the board of the variable resistance device includes two conductive patterns insulated from each other and two terminals provided corresponding to the respective conductive patterns, one of the conductive patterns is electrically connected to one of the terminals, the other of the conductive patterns includes a plurality of contact areas connected to the other of the terminals via respective resistors different in resistance, the sliding brush is provided to be capable of making contact with the one of the conductive patterns and contact with either one of the contact areas of the other of the conductive patterns, thus electrically connecting the conductive patterns to each other in conjunction with the protruding/retracting movement of the adjusting leg section, and a resistance of a circuit between the terminals via the conductive patterns varies in accordance with the contact area with which the sliding brush has a contact.

Although as the variable resistance device, a type of varying the resistance continuously (in an analog manner) by moving a sliding brush on the resistive element such as a common variable resistor can be used, by configuring as in this embodiment, since the resistance does not vary while the sliding brush has a contact with the same contact area, but varies when the sliding brush moves to another contact area, the resistance can be changed stepwise. Therefore, the keystone distortion correction of the projection image can also be performed stepwise, it is possible to perform the correction operation every time the distortion amount grows to some extent, thus the number of times of correction process can be reduced in comparison with the case in which the resistance varies continuously.

In the above embodiment, it is preferable that the interlocking device includes a biasing section for making the frame abut on an upper end of the adjusting leg section.

Here, since the frame of the interlocking device needs only to move in conjunction with the adjusting leg section, it is possible to join the adjusting leg section and the frame with a joint pin or the like, for example.

In contrast, by making the frame abut on the upper end of the adjusting leg section and biasing the frame by the biasing section as in the present embodiment, the frame can be moved in conjunction with the adjusting leg section with an extremely simple structure. Further, since there is no need for providing a special configuration to the side of the adjusting leg section, it can be applied to the existing adjusting leg section, thus having a high versatility, and cost reduction becomes possible.

According to another embodiment, there is provided a keystone distortion correction method for a projector for modulating a light beam emitted from a light source in accordance with image information and for enlargedly projecting the modulated light beam, the projector including an adjusting leg section configured to be capable of protruding/retracting outside/inside an exterior chassis and for changing a tilt condition of the projector, an interlocking device displacing in conjunction with the protruding/retracting movement of the adjusting leg section, a variable resistance device having a resistance varying in accordance with the displacement of the interlocking device, a voltage detection device for detecting a voltage varying in accordance with the resistance of the variable resistance device, a storage device for storing keystone distortion correction amount information representing a relationship between the voltage detected by the voltage detection device and the keystone distortion correction amount of the projection image, and the keystone distortion correction method including obtaining previously the keystone distortion correction amount information and storing the information on the storage device, and obtaining a keystone distortion correction amount corresponding to the detected voltage in the voltage detection device when the projector is installed by protruding/retracting the adjusting leg section from the keystone distortion correction amount information stored in the storage device, and correcting the projection image with the keystone distortion correction amount.

According to the embodiment described above, the same functions and advantages as those of the projector of the another embodiment can be obtained. Specifically, in the case in which the adjusting leg section (foot) makes protruding/retracting movement, the keystone distortion correction device can obtain the keystone distortion correction amount of the projection image based on the voltage detected by the voltage detection device by looking up the keystone distortion correction amount information, and further automatically correct the keystone distortion of the projection image using the correction amount.

Further, since the interlocking device can be composed of inexpensive components such as a frame and a spring, and the variable resistance device is also less expensive in comparison with a range sensor or an acceleration sensor, the keystone distortion correction can automatically be performed at a low price in the projector. Therefore, the auto keystone function can be implemented even in low price popularization models, the adjustment work in installing the projector can be made easier, and the user-friendliness can be enhanced.

Further, since the interlocking device is provided, the existing members can directly be used as the adjusting leg section, the cost can also be reduced in comparison with the case in which a special adjusting leg section is used.

BRIEF DESCRIPTION OF THE DRAWINGS

Exemplary Embodiments of the invention will now be described with reference to the accompanying drawings, wherein like numbers refer to like elements.

DESCRIPTION OF EXEMPLARY EMBODIMENTS

First Embodiment

A first exemplary embodiment will hereinafter be explained with reference to the accompanying drawings. Schematic Configuration of the Projector FIG. 1 is a block diagram showing a schematic configuration of a projector 1 according to the first embodiment.

The projector 1 is for forming an optical image by modulating an optical beam emitted from the light source in accordance with image information, and enlargedly projecting the formed optical image on a screen.

Figure 1:
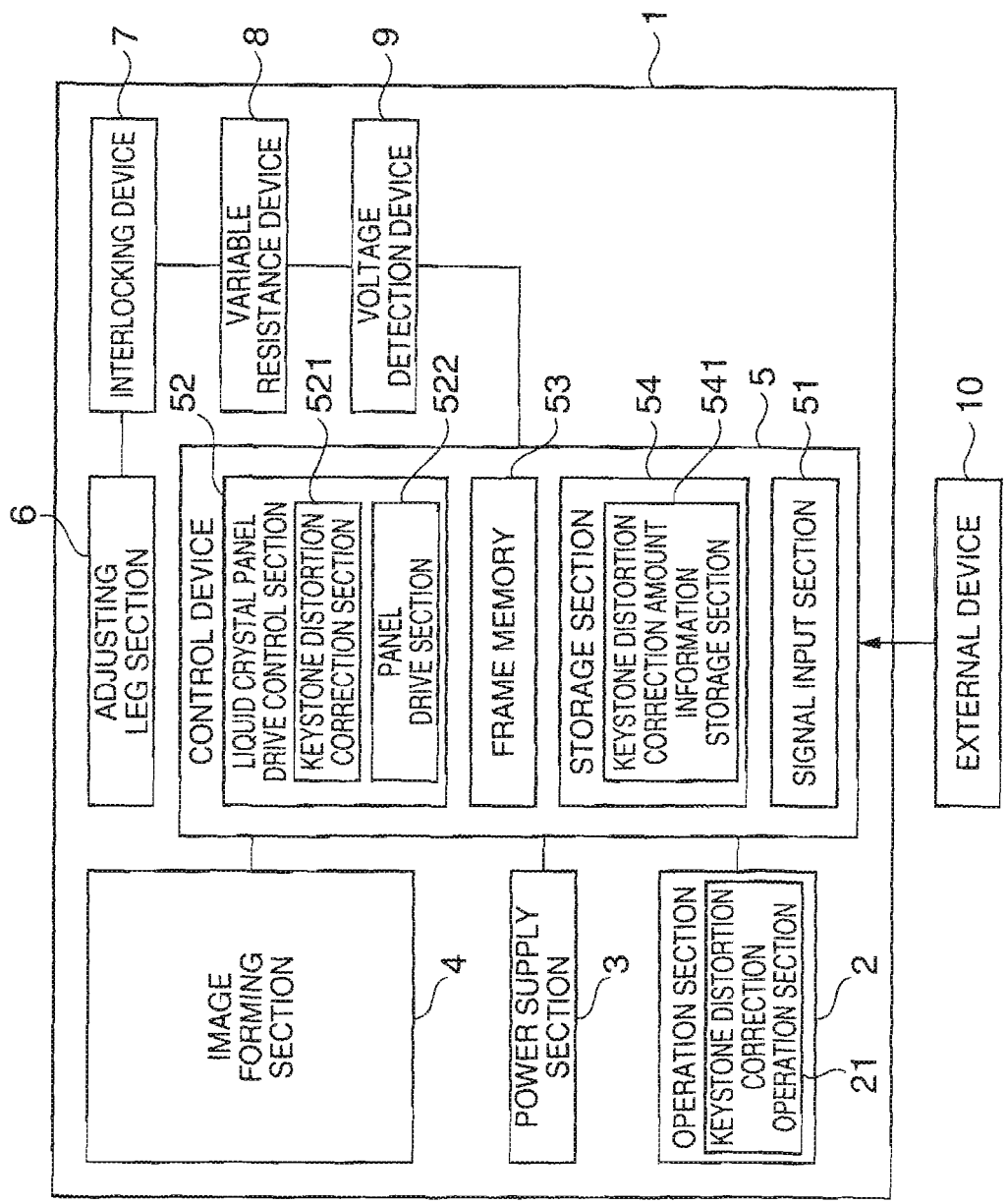
FIG. 1 is a block diagram showing a schematic configuration of a projector according to a first embodiment.

As shown in FIG. 1, the projector 1 is composed mainly of an operation section 2 as a setting input section, a power supply section 3, an image forming section 4, a control device 5, an adjusting leg section 6, an interlocking device 7, a variable resistance device 8, and a voltage detection device 9.

The operation section 2 is composed of a remote controller not shown, and a button and key provided to the projector 1, and recognizes an operation by the user to output a predetermined operation signal to the control device 5. As shown in FIG. 1, the operation section 2 is provided with a keystone distortion correction operation section 21, and so on. It should be noted that in FIG. 1, illustrations of other input sections in the operation section 2, such as an input section for performing powering ON/OFF of the projector 1, an input section for performing volume control, an input section for performing image quality control of a projection image, an input section for performing focus control of the projection image, and an input section for performing zoom control of the projection image are omitted.

The keystone distortion correction operation section 21 is an input button used by the user when the user manually adjusts the keystone distortion correction. The keystone distortion correction operation section 21 recognizes the input operation by the user to output a predetermined operation signal as a keystone distortion correction amount to the control device 5.

The power supply section 3 supplies each section of the projector 1 with the electricity supplied from the outside. Although not shown in the drawings, the power supply section 3 is composed, for example, of a main power supply for supplying each section of the projector 1 with the electricity supplied from the outside and an auxiliary power supply for supplying only the control device 5 of the projector 1 with the electricity supplied from the outside in the case in which the main power supply is turned OFF (standby state) in response to the operation of the operation section 2 by the user.

The image forming section 4 forms an optical image and enlargedly projects it on the screen under control by the control device 5. Although not shown in the drawing, the image forming section 4 has a typical configuration provided with a light source device including a light source lamp such as a super high pressure mercury vapor lamp, a liquid crystal light valve as a light modulation device formed of a transmissive liquid crystal panel, a projection optical device including a projection lens, and so on.

Figure 2:
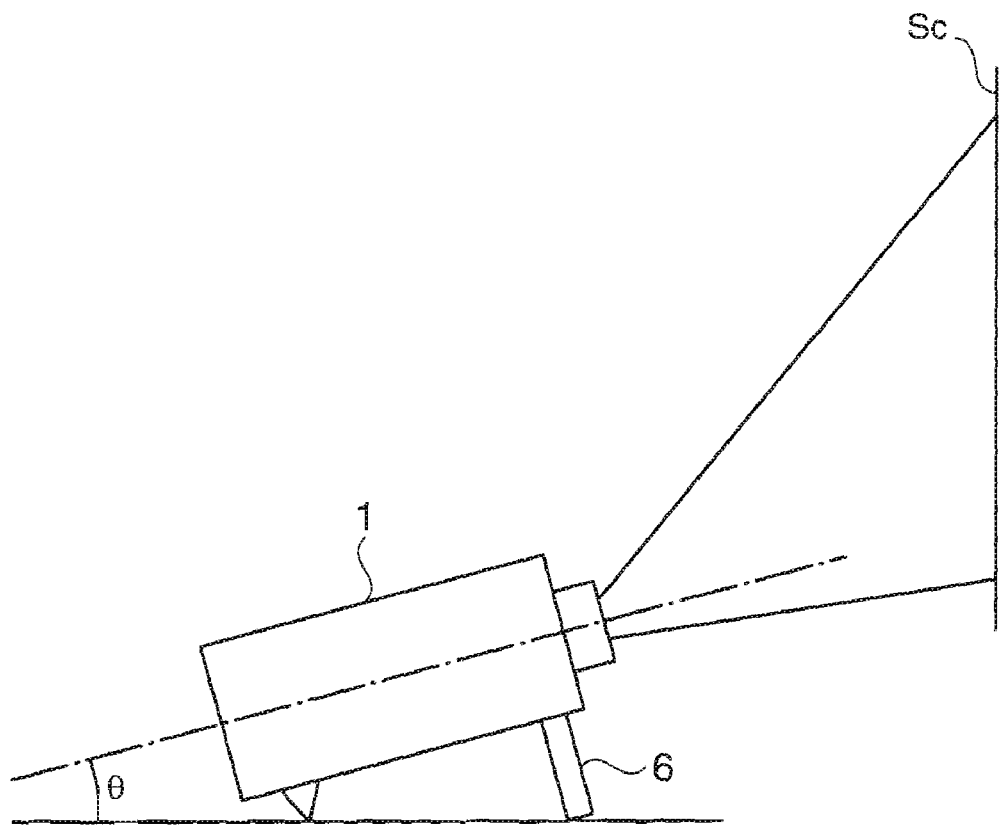
FIG. 2 is a side view schematically showing a projection condition of a projector according to the embodiment.
Figure 3:
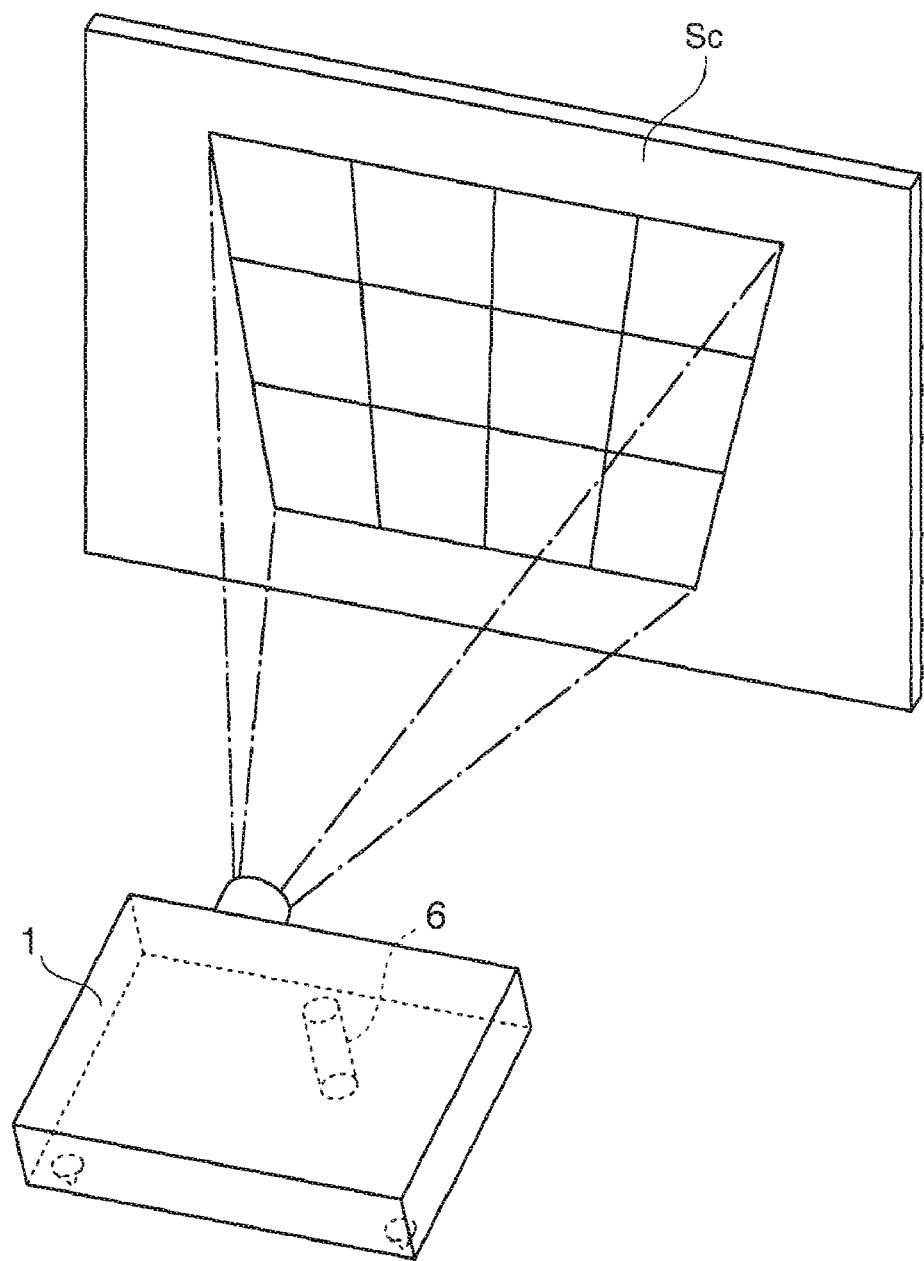
FIG. 3 is a perspective view schematically showing the projection condition of the projector according to the embodiment.

As shown in FIGS. 2 and 3, the adjusting leg section 6 is disposed at the center portion on the front side of the bottom section of the projector 1. The adjusting leg section 6 is configured to be capable of protruding from and retracting into the exterior chassis of the projector 1, touches the ground plane such as a desk at the tip portion thereof when the projector 1 is installed with a normal posture, and changes the tilt condition in the vertical direction of the projector 1 by protruding or retracting. Then, as a result, the position of the projected image on the screen Sc is moved in the vertical direction.

Figure 4:
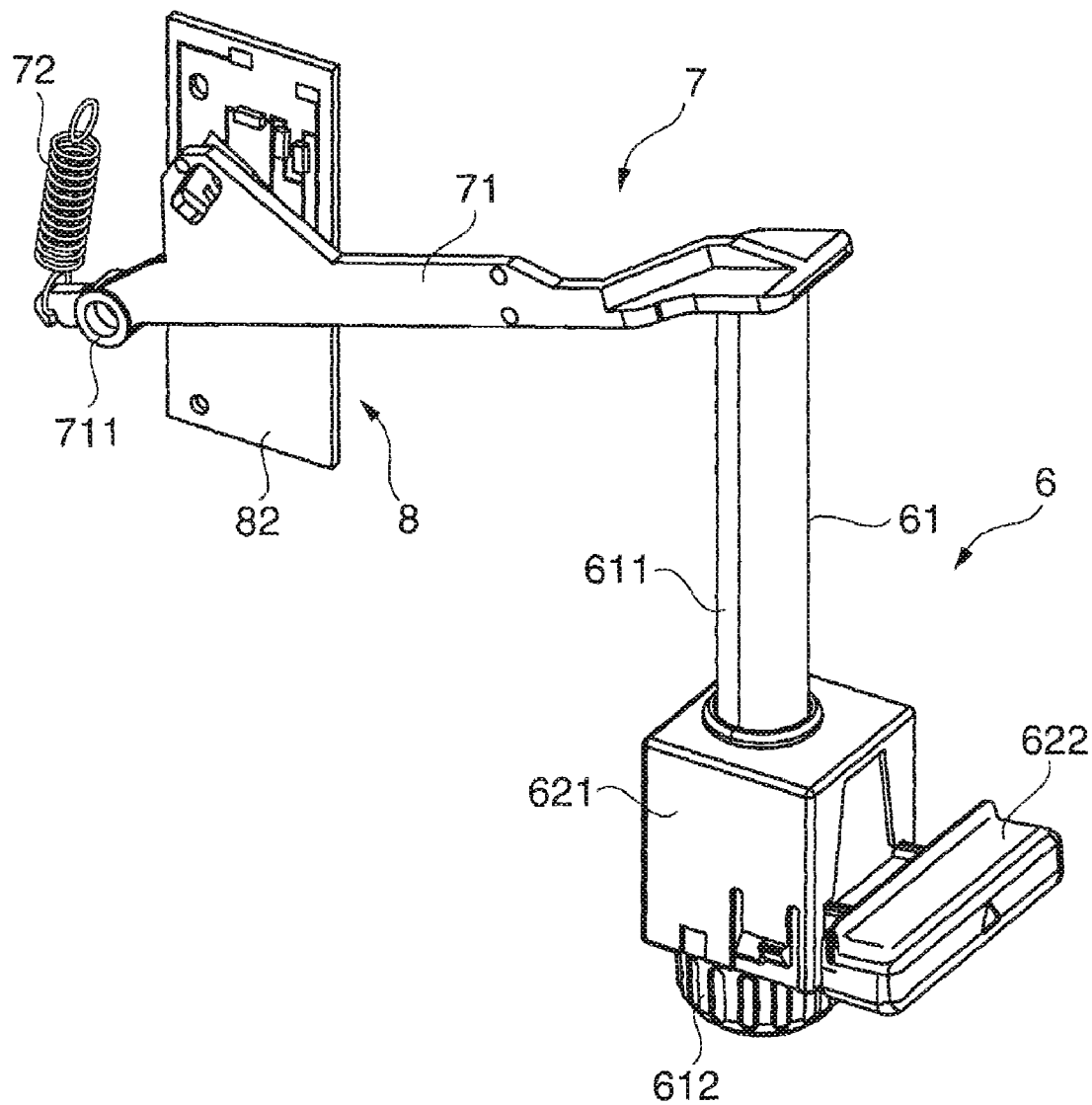
FIG. 4 is a perspective view showing the configuration of an adjusting leg section and an interlocking device according to the embodiment.
Figure 5:
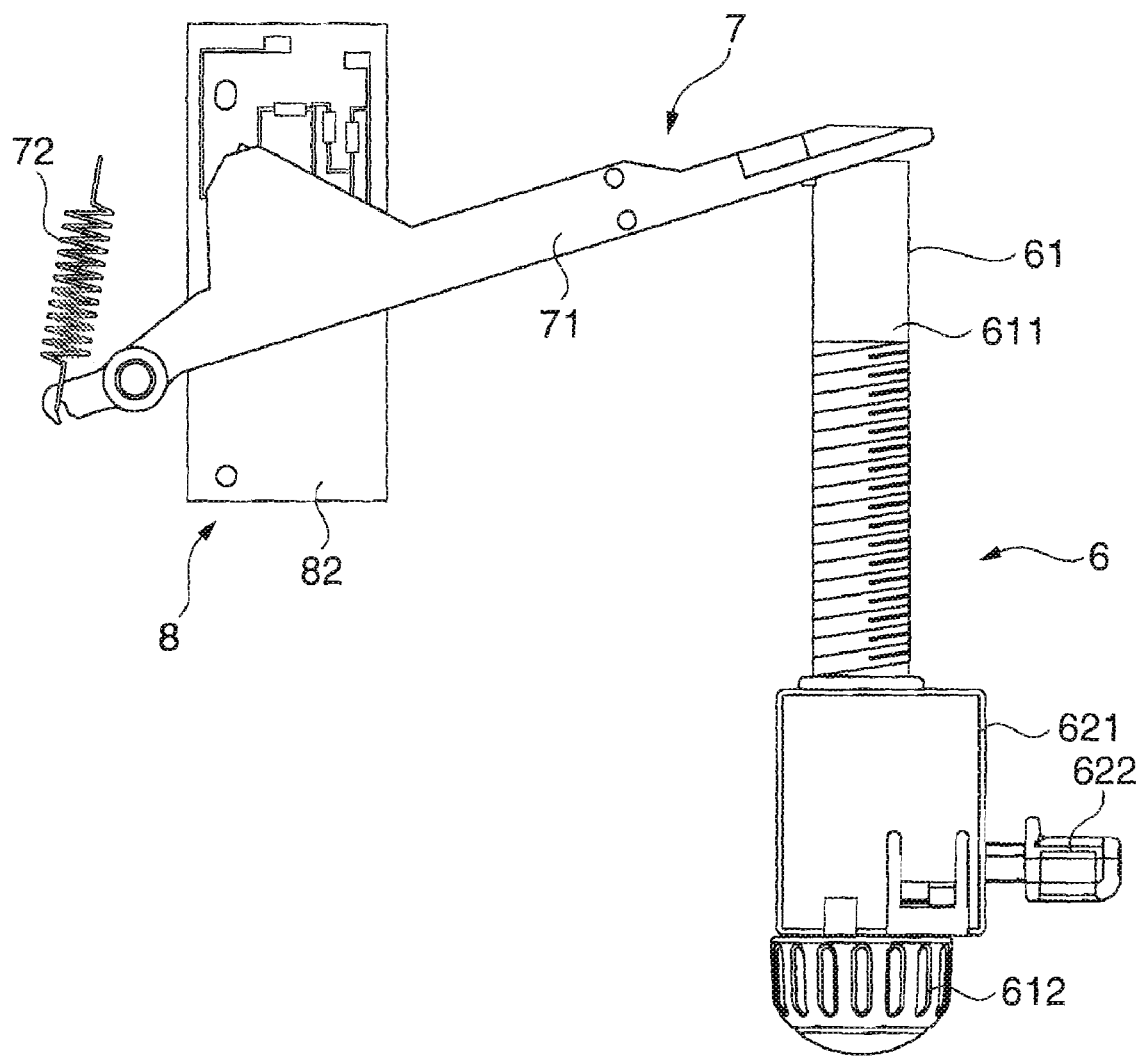
FIG. 5 is a side view showing the configuration of the adjusting leg section and the interlocking device according to the embodiment.

As shown in FIGS. 4 and 5, the adjusting leg section 6 is configured including a foot 61, a box 621 in which the foot 61 is inserted, and an operation lever 622. The foot 61 is provided with a shaft section 611 formed to have a substantially rod-like shape and a cap 612 attached to the shaft section 611 at the lower end thereof. The outer periphery of the shaft section 611 is provided with a thread.

The lever 622 is arranged to be able to be manually operated in the vertical direction with respect to the box 621, and is configured to mesh with the thread on the foot 61 when positioned on the lower side and to be released in the engagement of the thread with the foot 61 when positioned on the upper side. Therefore, by operating the operation lever 622 upward, the foot 61 can freely be moved up and down with respect to the box 621 to dynamically change the protruding/retracting position of the foot 61, thus allowing a so-called rough adjustment. Further, in the condition in which the operation lever 622 is reset to the lower position, the protruding/retracting position of the foot 61 can be fine adjusted with the function of the thread by rotating the foot 61 around the shaft.

Figure 6:
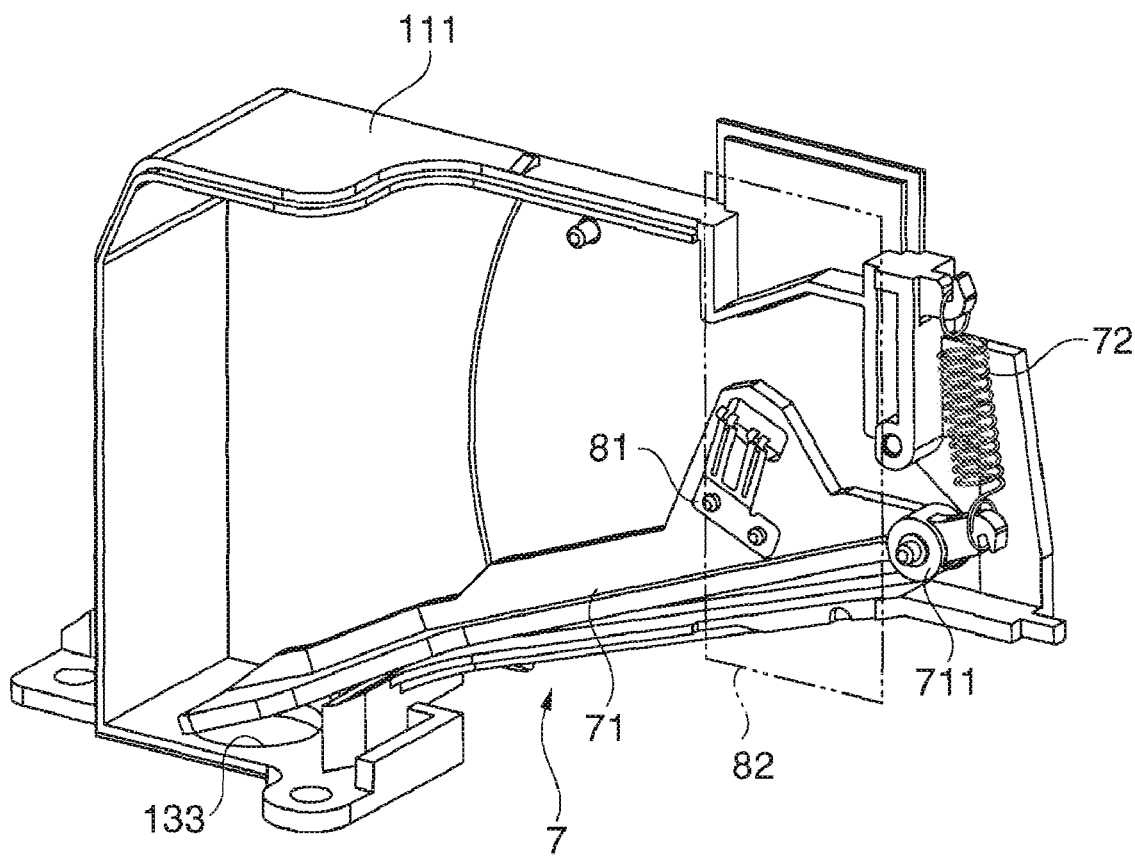
FIG. 6 is a perspective view showing the configuration of the interlocking device according to the embodiment.
Figure 7:
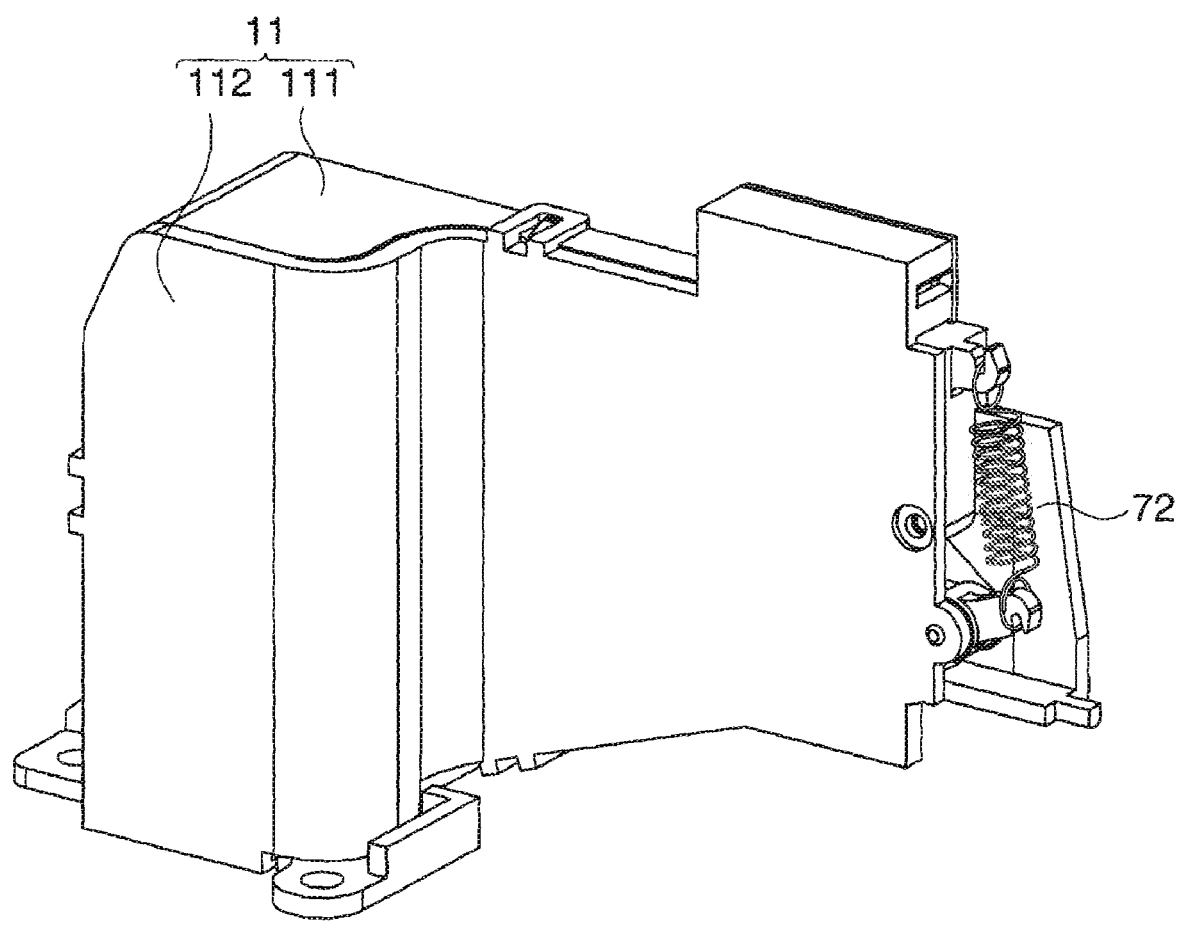
FIG. 7 is a perspective view showing the configuration of the interlocking device according to the embodiment.

As shown also in FIGS. 6 and 7, the interlocking device 7 is configured including a frame 71 disposed inside a support box 11 incorporated in the chassis of the projector 1 and rotatably supported via a pivot 711, and a coil spring 72 as a biasing section for biasing the frame 71 to abut on the upper end section of the foot 61 at one end of the frame 71.

The support box 11 is composed of a box main body 111 rotatably accommodating the frame 71 and a box lid member 112 for sealing the opening side of the box main body 111. Further, the pivot 711 of the frame 71 is supported by each of the box main body 111 and the box lid member 112. Further, the box main body 111 is provided with a hole 133 formed through the bottom thereof, the shaft section 611 of the foot 61 is inserted through the hole 133 thus the upper end of the shaft section 611 abuts on the one end of the frame 71.

The coil spring 72 is mounted between the other end of the frame 71 and the box main body 111 to pull the other end side of the frame 71 upward. Therefore, the one end of the frame 71 is always biased downward to always abut on the upper end of the shaft section 611 of the foot 61 with predetermined pressing force.

Therefore, when the foot 61 moves in a protruding or retracting manner, the one end of the frame 71 also moves while keeping the abutting state with the foot 61 by the operation of the coil spring 72, and thus the whole of the frame 71 is rotated around the pivot 711.

Figure 8:
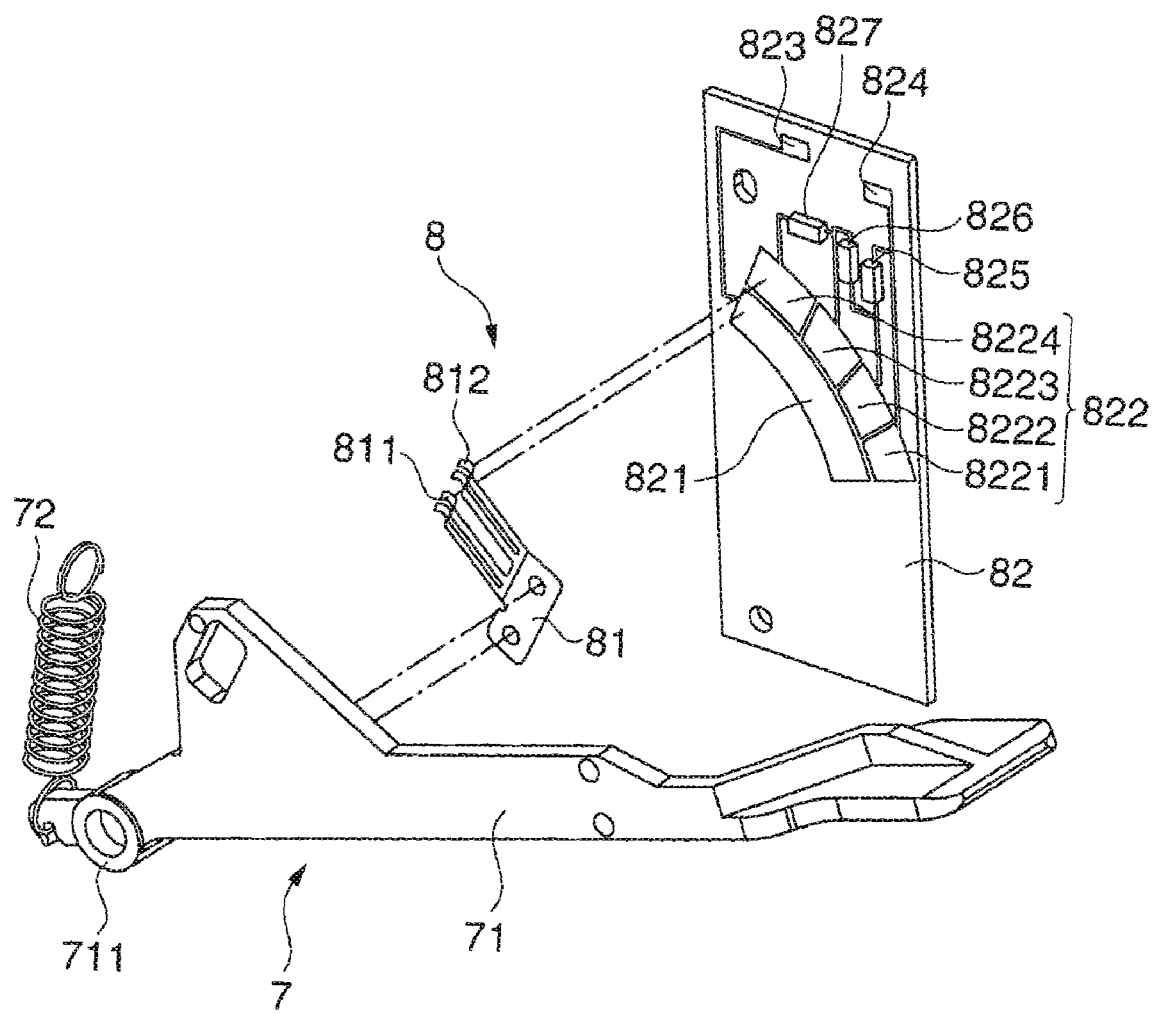
FIG. 8 is a perspective view showing the configuration of the interlocking device and a variable resistance device according to the embodiment.

As shown also in FIG. 8, the variable resistance device 8 is provided with a sliding brush 81 made of metal and attached to the frame 71 of the interlocking device 7 and a board 82 attached to the box lid member 112 on the inside surface thereof.

Figure 9:
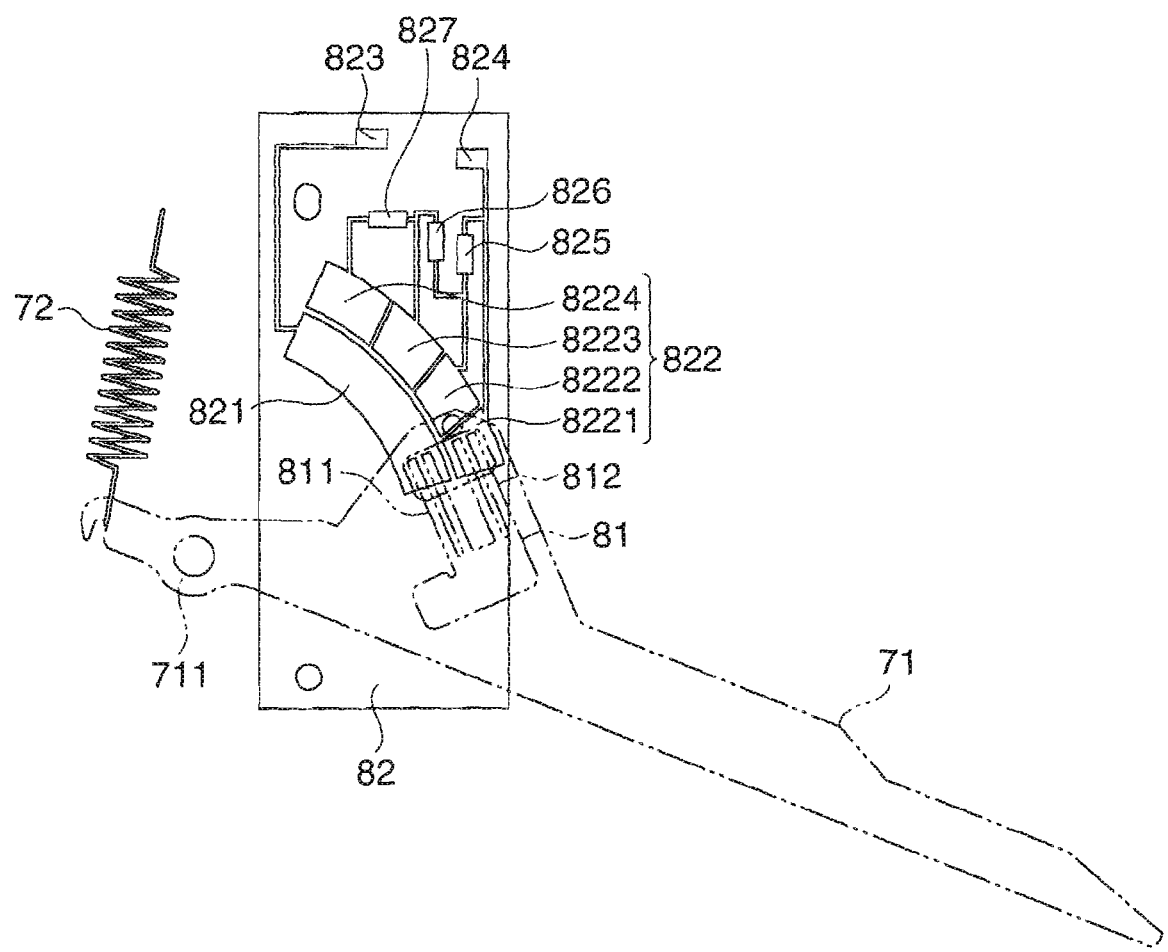
FIG. 9 is a side view showing the configuration of the variable resistance device according to the embodiment.

In the frame 71, the mounting position of the sliding brush 81 is arranged so that the distance between the sliding brush 81 and the pivot 711 becomes shorter in comparison with the distance between the abutting position in the frame 71 with the foot 61 and the pivot 711. Specifically, as shown also in FIG. 9, the sliding brush 81 is attached between the abutting position in the frame 71 with the foot 61 and the pivot 711. Therefore, the amount of movement of the sliding brush 81 is arranged to be smaller in comparison with the amount of movement of the foot 61 in proportion to the ratio between the distances.

The sliding brush 81 is provided with contacts 811, 812, and each of the contacts 811, 812 is formed of a bifurcated contact reed. These contact reeds are integrated on the root side thereof, and electrically connected to each other.

The board 82 is provided with two conductive patterns 821, 822 insulated from each other.

One conductive pattern 821 is formed continuously in a substantially circular arc-like shape, and is arranged so that the one contact 811 of the sliding brush 81 moves while keeping the contact with the conductive pattern 821 when the frame 71 rotates in response to the movement of the foot 61. The conductive pattern 821 is electrically connected to a terminal section 823 for soldering a lead wire with a wiring pattern.

The other conductive pattern 822 is disposed in a substantially circular arc-like shape, and is divided into a plurality of contact areas 8221 through 8224 insulated from each other.

Further, the contact area 8221 is electrically connected to a terminal section 824 for soldering a lead wire with a wiring pattern. The contact area 8222 is electrically connected to the terminal section 824 via a chip resistor 825. The contact area 8223 is electrically connected to the terminal section 824 via chip resistors 825, 826 connected in series with each other. The contact area 8224 is electrically connected to the terminal section 824 via chip resistors 825, 826, 827 serially connected.

Further, the other contact 812 of the sliding brush 81 is arranged to have a contact with each of the contact areas 8221 through 8224 of the conductive pattern 822 when the frame 71 rotates in response to the movement of the foot 61.

The voltage detection device 9 is electrically connected to each of the conductive patterns 821, 822 via the lead wires soldered on each of the terminal sections 823, 824 of the board 82, thus it is configured to be able to detect the voltage between the terminal sections 823, 824.

In this case, since the number of chip resistors 825, 826, 827 disposed between each of the contact areas 8221 through 8224 and the terminal section 824 varies from zero to three, the resistances between the contact areas 8221 through 8224 and the terminal section 824 are different from each other. Therefore, the resistance between the terminal sections 823, 824 also varies in accordance with the position of the sliding brush 81 to the conductive patterns 821, 822, more specifically, which one of the contact areas 8221 through 8224 the contact 812 has contact with.

Further, since the voltage between the terminal sections 823, 824 detected by the voltage detection device 9 also varies as the resistance varies, which position the sliding brush 81 exists in can be detected with the voltage detected by the voltage detection device 9. Since the position of the sliding brush 81 moves with the position of the foot 61 via the frame 71, the position of the foot 61 can indirectly be detected with the voltage detected by the voltage detection device 9.

It should be noted that the relationship between the voltage detected by the voltage detection device 9 and the position (the position of one of the contact areas 8221 through 8224 with which the sliding brush 81 has contact) of the sliding brush 81 can be obtained by calculation based on the resistances of the chip resistors 825, 826, 827 and so on, or figured out by previously measuring the voltage by the voltage detection device 9 while actually making the sliding brush 81 have contact with each of the contact areas 8221 through 8224.

Further, an insulation sections (gap sections) formed among the contact areas 8221 thorough 8224 are diagonally formed to the moving direction of the sliding brush 81, namely the direction of the circular arc along which the conductive pattern 822 is continued. Therefore, each of the contact reeds of the contact 812 is arranged so that at least one of the contact reeds has a contact with either one of the contact areas 8221 through 8224, thus preventing that the both of the contact reeds fall in the insulation sections among the contact areas 8221 through 8224.

The control device 5 is provided with an arithmetic processing unit such as a central processing unit (CPU), and performs a predetermined program to control the power supply section 3, the image forming section 4, the voltage detection section 9, and so on. Further, the control device 5 controls the image forming section 4 to form an image corresponding to an image signal input from an external device 10 and so on, and to project the image on the screen.

As shown in FIG. 1, the control device 5 includes a signal input section 51, a liquid crystal panel drive control section 52 as a display control device, a frame memory 53, and a storage section (storage device) 54.

The signal input section 51 inputs the image signal and so on output from various external devices, converts it into the image signal processable in the liquid crystal panel drive control section 52, and then outputs it. Then, the image signal (a digital image signal) output from the signal input section 51 is, for example, temporarily recorded on the frame memory 53 as image data for every one frame.

The liquid crystal panel drive control section 52 appropriately retrieves the image data output from the signal input section 51 and sequentially stored in the frame memory 53, performs a predetermined process on the retrieved image data, and outputs a drive signal as the image information corresponding to the image on which the process is performed to the liquid crystal light valve of the image forming section 4 to form a predetermined optical image. As the predetermined process in the liquid crystal panel drive control section 52, for example, an image size control process such as expansion or shrinkage, a keystone distortion correction process, an image quality control process, a gamma correction process, and so on can be cited. It should be noted that the image size control process such as expansion or shrinkage, the image quality control process, and the gamma correction process are well-known art, and accordingly detailed explanations therefor will be omitted here, and hereinafter, the keystone distortion correction process will only be explained. As shown in FIG. 1, the liquid crystal panel drive control section 52 is provided with a keystone distortion correction section (a keystone distortion correction device) 521 and a panel drive section 522.

The keystone distortion correction section 521 looks up keystone distortion correction amount information described later and stored in the storage section 54 to obtain the keystone distortion correction amount corresponding to the voltage output from the voltage detection device 9. Then, the keystone distortion correction section 521 performs a correction process of the keystone distortion of the projection image caused when the tilt projection is performed by the projector 1 on the image data retrieved from the frame memory 53 based on the keystone distortion correction amount thus obtained. The keystone distortion correction process is, for example, for varying the number of pixels in the scan line by a predetermined number of scan lines, or for performing such a digital process as changing the time axis.

The panel drive section 522 outputs the image data output from the keystone distortion correction section 521 and the drive signal corresponding to the black image data to the liquid crystal light valve. Further, the liquid crystal light valve forms an optical image, on which the keystone distortion correction process described above is performed, in accordance with the drive signal.

It should be noted that although the keystone distortion correction process is performed automatically by the keystone distortion correction section 521, in the case in which the user operates the keystone distortion correction operation section 21 in addition to the keystone distortion correction process described above, the keystone distortion correction section 521 performs the correction operation after adjusting the keystone distortion correction amount in accordance with the amount of the operation by the user.

As shown in FIG. 1, the operation section 54 is provided with a keystone distortion correction amount information storage section 541. The keystone distortion correction amount information storage section 541 stores the keystone correction amount information including the protruding/retracting position of the foot 61 of the adjusting leg section 6 indirectly detected with the voltage of the voltage detection device 9, and the keystone distortion correction amount for correcting the keystone distortion of the projection image in the case with that voltage (protruding/retracting position) in conjunction with each other.

The keystone distortion correction amount information can be stored in the form of, for example, a lookup table or a function.

Keystone Distortion Correction Method for the Projector

Hereinafter, the keystone distortion correction method for the projector 1 will be explained.

Preparation Process

The keystone distortion correction amount information is previously stored in the keystone distortion correction amount information storage section 541 of the projector 1. Typically, the relationship between the tilt angle of the projector and the keystone distortion amount has been examined, the relationship between the detected voltage by the voltage detection device 9 corresponding to the position of the foot 61 and the keystone distortion correction amount has been obtained, and the information has been stored in the keystone distortion correction amount information storage section 541 when the projector 1 has been manufactured.

Keystone Distortion Correction Process

When installing the projector 1 for use, the user operates the operation lever 622 to protrude/retract the foot 61 by the rough adjustment, and rotates the cap 612 of the foot 61 to perform the fine adjustment.

When the foot 61 of the adjusting leg section 6 is protruded/retracted, the frame 71 of the interlocking device 7 rotates in conjunction thereto. The sliding brush 81 of the variable resistance device 8 moves on the conductive pattern 821, 822 of the board 82 in conjunction to the rotation of the frame 71.

The resistance between the terminal sections 823, 824, namely the voltage between the terminal sections 823, 824 detected by the voltage detection device 9 varies in accordance with the position where the sliding brush 81 has contacts with the conductive patters 821, 822.

The keystone distortion correction section 521 of the liquid crystal panel drive control section 52 looks up the voltage output from the voltage detection device 9 and the keystone distortion correction amount information stored on the keystone distortion correction amount information storage section 541, and obtains the keystone distortion correction amount corresponding to the voltage.

Further, the keystone distortion correction section 521 performs the keystone distortion correction process with the keystone distortion correction amount thus obtained.

Figure 10B:
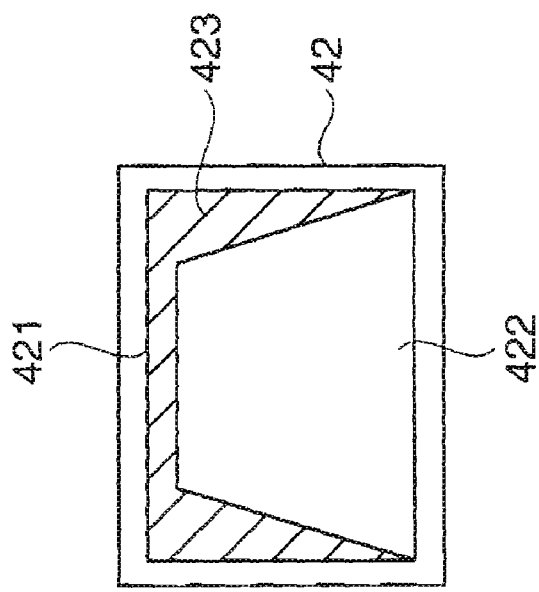
FIGS. 10A and 10B are diagrams showing a specific example of the keystone distortion correction process according to the embodiment.
Figure 10A:
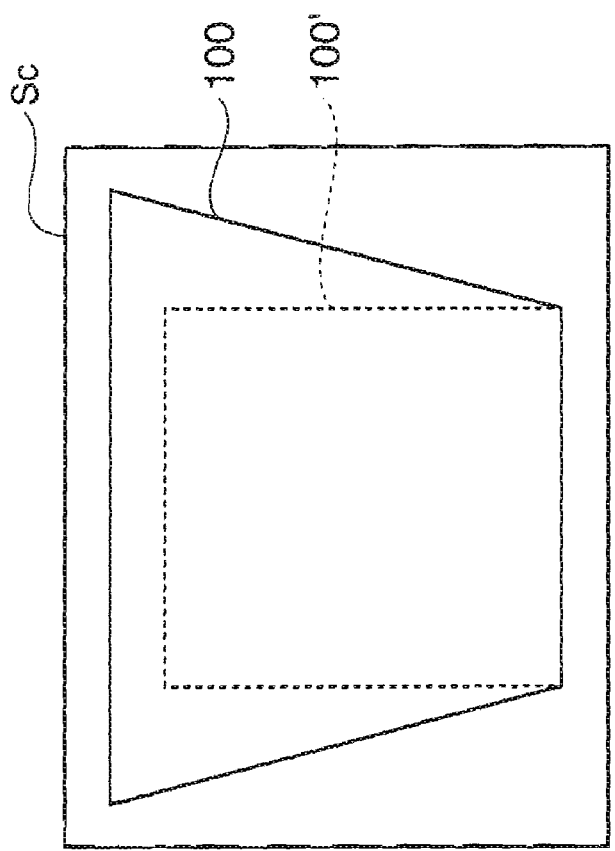

FIGS. 10A and 10B are diagrams showing a specific example of the keystone distortion correction process by the keystone distortion correction section 521.

For example, as shown in FIGS. 2 and 3, in the case in which the projector 1 is disposed at a slant to project an image upward, and the tilt projection in the vertical direction is performed, the optical axis of the light beam projected from the projector 1 is tilted from the normal line direction of the screen Sc plane, and as shown in FIG. 10A, the width of the upper side of the projection image 100 projected on the screen Sc becomes wider, and the width of the lower side thereof becomes narrower. In this case, the keystone distortion correction section 521 performs the keystone distortion correction process described above on the image data retrieved from the frame memory 53 in accordance with the keystone distortion correction amount obtained based on the voltage output from the voltage detection device 9 in order for correcting the projection image 100 to be the projection image 100' having no distortion. Further, in the keystone distortion correction process, as shown in FIG. 10B, the vertical direction distortion correction is performed, in which a correction forming area 422 previously distorted in the counter direction to the distortion condition of the projection image 100 to narrow the top side width of a forming area 421 for making the liquid crystal light valve form the optical image, and to widen the bottom side width thereof. Further, the keystone distortion correction section 521 masks the area 423 obtained by removing the correction forming area 422 from the forming area 421 by setting the area 423 in the blanking condition. Thus, the keystone distortion is corrected, and the projection image having no distortion can be projected on the screen Sc.

According to the first embodiment having such a configuration, the following advantages can be obtained.

1. Since there are provided the interlocking device 7 moving in conjunction with the protruding/retracting movement of the adjusting leg section 6, the variable resistance device 8 whose resistance varies in accordance with the movement of the interlocking device 7, and the voltage detection device 9 for detecting the variation of the resistance as the variation in the voltage, the amount of protruding/retracting of the adjusting leg section 6, namely the tilt angle of the projector 1 can be detected with the voltage of the voltage detection device 9. Further, the keystone distortion correction section 521 can perform the keystone distortion correction operation with the keystone distortion correction amount obtained in accordance with the voltage by looking up the keystone distortion correction amount information storage section 541.

Therefore, since a range sensor or an acceleration sensor necessary in the past can be eliminated, the interlocking device 7 can be composed of inexpensive components such as the frame 71 and the coil spring 72, and thus, the auto keystone operation can be realized with a simple configuration, the cost can be reduced, and the auto keystone function can be implemented even in low price popularization models.

2. Since the sliding brush 81 is not attached directly to the foot 61, but is attached to the interlocking device 7, and no particular configuration for the variable resistance device 8 needs to be provided to the foot 61, the existing members can directly be used as the adjusting leg section 6, and accordingly, it can be provided at a lower price. Further, since there is no need for providing the foot 61 with a special process, the beauty is not spoiled even in the case in which the foot 61 protrudes outside the exterior chassis, thus the design property can be enhanced.

3. Since the rotating frame 71 is used as the interlocking device 7, the movement amount of the sliding brush 81 can be reduced in comparison with the movement amount of the foot 61, thus the board 82 provided with the conductive patters 821, 822 can be made smaller. Therefore, the space reduction of the board 82 and the cost reduction can be achieved.

Further, since the movement amount of the sliding brush 81 is small in comparison with the movement amount of the foot 61, the influence of the "backlash" of the adjusting leg section 6 can be absorbed. Therefore, the resistance of the variable resistance device 8, namely the voltage detected by the voltage detection device 9 can be stabilized, thus the keystone distortion correction process can reliably and stably be performed.

Second Embodiment

Hereinafter, a second exemplary embodiment will be explained with reference to FIGS. 11 and 12.

The projector 1 according to the second embodiment is different from that of the first embodiment in configurations of interlocking device 7A and the variable resistance device 8A, and the same in other configurations. Therefore, in the following explanations, similar structures and the same members as in the first embodiment are denoted with the same reference numerals, and detailed explanations therefor will be omitted or simplified.

Figure 11:
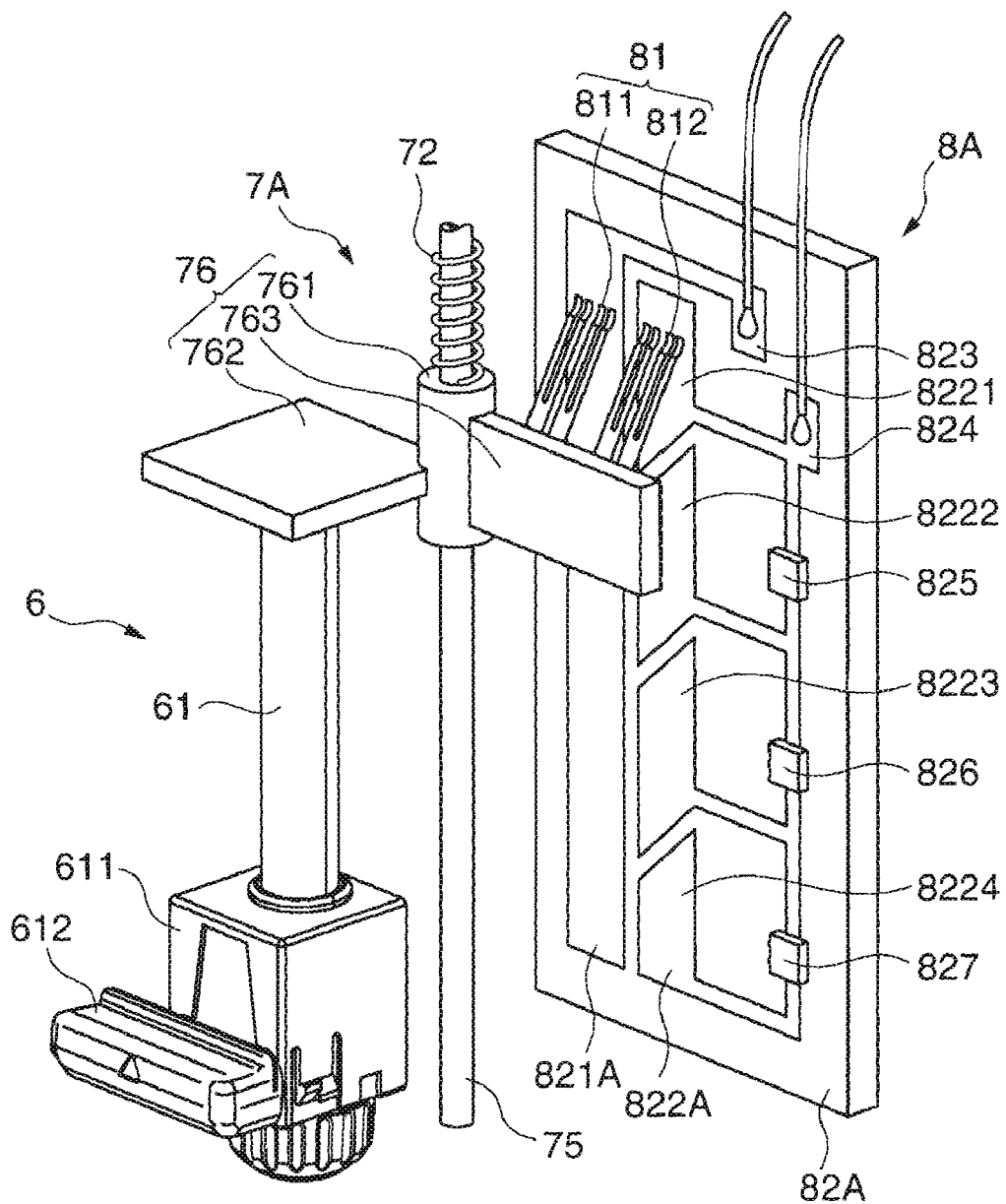
FIG. 11 is a perspective view showing the configuration of the interlocking device and the variable resistance device according to a second embodiment.
Figure 12:
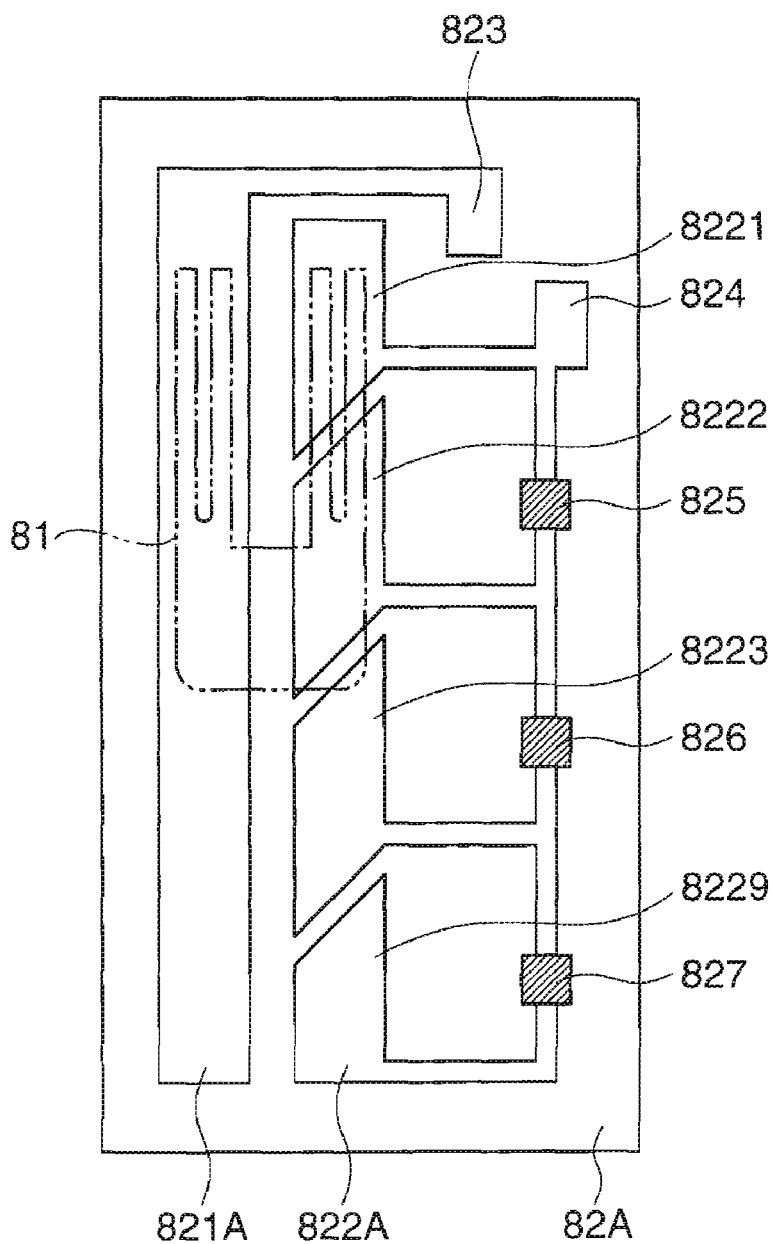
FIG. 12 is a diagram showing the configuration of the variable resistance device according to the second embodiment.

As shown in FIG. 11, the interlocking device 7A includes a shaft 75 disposed collaterally with the foot 61 and along the protruding/retracting direction of the foot 61, a frame 76 provided to be movable linearly along the shaft 75, and a coil spring 72 for biasing the frame 76 to abut on the upper end of the foot 61 inside the chassis of the projector 1.

In further detailed explanations, the frame 76 has a guide section 761 in which the shaft 75 is inserted, an abutting section 762 formed continuously to the guide shaft 761 and abutting on the upper end of the foot 61, and a fixing section 763, which is formed continuously to the guide section 761 and the sliding brush 81 is fixed to.

Further, the coil spring 72 has a shaft 75 inserted therein and presses the upper end of the guide section 761 to bias the frame 76 downward, namely to the side of the foot 61.

The variable resistance device 8A is provided with a board 82A similarly to the variable resistance device 8 according to the first embodiment. Although the board 82A is also provided with conductive patterns 821A, 822A formed thereon, since the frame 76, namely the sliding brush 81 moves linearly, the conductive patterns 821A, 822A are also formed linearly.

It should be noted that the point that the conductive patterns 821A, 822A are electrically connected to the terminal sections 823, 824 via the wiring pattern, respectively, the point that the conductive pattern 822A is provided with contact areas 8221 through 8224 and the chip resistors 825, 826, 827, and the point that the insulation sections among the contact areas 8221 through 8224 are formed diagonally with respect to the moving direction of the sliding brush 81 are similar to the first embodiment.

Also in such a second embodiment, when the foot 61 of the adjusting leg section 6 protrudes/retracts, the frame 76 moves in conjunction with the movement. Therefore, since the position on the conductive patterns 821A, 822A where the sliding brush 81 has a contact, specifically the contact areas 8221 through 8224 with which the contact 812 of the sliding brush 81 has a contact varies, the resistance between the terminal sections 823, 824 varies, and the voltage detected by the voltage detection device 9 becomes the value corresponding to the protruding/retracting position of the foot 61. Therefore, similarly to the first embodiment, the keystone distortion correction section 521 obtains the keystone distortion correction amount corresponding to the voltage from the keystone distortion correction amount information storage section 541, and performs the keystone distortion correction process with the correction amount.

Also in such a second embodiment, the similar functions and advantages to the items 1 and 2 of the first embodiment can be obtained.

4. Further, since the frame 76 is moved back and forth in the same direction as the foot 61, the board 82A can be disposed closer to the adjusting leg section 6 in comparison with the case of using the rotating frame 71, thus the mounting operation inside the exterior chassis of the projector 1 can easily be performed.

Further, since the foot 61 and the frame 76 are the same in amount of movement, by measuring the amount of movement of the frame 76 and the amount of variation of the resistance, the relationship between the amount of movement of the foot 61 and the amount of variation of the resistance can directly be obtained, thus the relationship between the voltage and the keystone distortion correction amount can easily be obtained.

Third Embodiment

Figure 13:
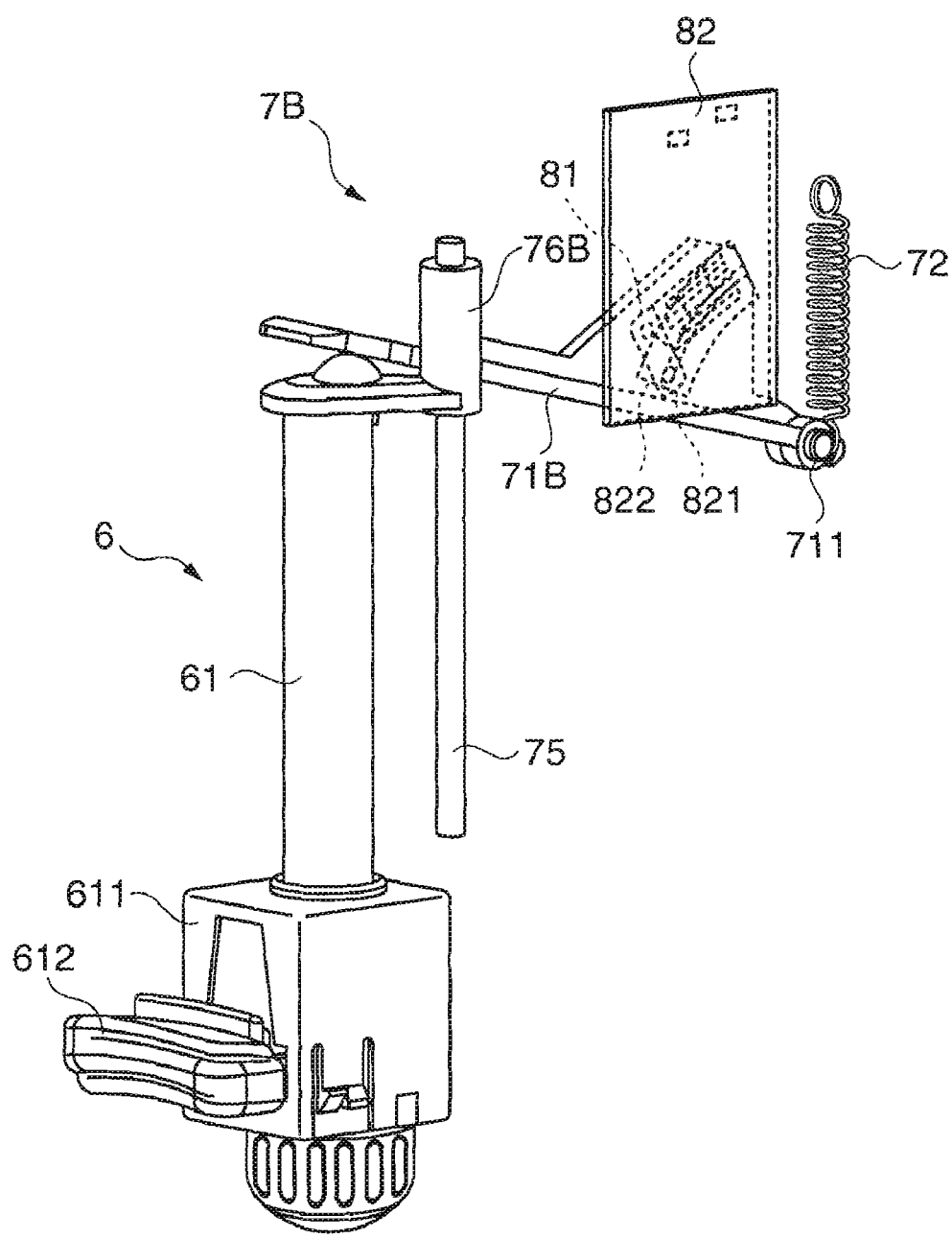
FIG. 13 is a perspective view showing the configuration of the interlocking device and the variable resistance device according to a third embodiment.

Hereinafter, a third exemplary embodiment will be explained with reference to FIG. 13.

The projector 1 according to the third embodiment is different from that of the first embodiment in configurations of interlocking device 7B, and the same in other configurations. Therefore, in the following explanations, similar structures and the same members as in the first embodiment are denoted with the same reference numerals, and detailed explanations therefor will be omitted or simplified.

The interlocking device 7B of the third embodiment includes a shaft 75, a frame 76B guided by the shaft 75, a frame 71B rotatably provided around the pivot 711, and the coil spring 72 as the biasing section that makes one end of the frame 71B abut on the upper surface of the frame 76B.

Further, the frame 71B is provided with the sliding brush 81 attached thereto similarly to the first embodiment, the resistance varies in accordance with the contact position between the sliding brush 81 and the conductive patterns 821, 822 of the board 82, and it is configured that the voltage detected by the voltage detection device 9 varies in accordance with the protruding/retracting position of the foot 61.

According to such a third embodiment, the similar functions and advantages to the first embodiment can be obtained.

Specifically, the interlocking device 7B combines the frame 76B linearly moving along the protruding/retracting direction of the foot 61 and the frame 71B rotating in conjunction with the movement of the frame 76B with each other. Therefore, by using the rotating frame 71B, the size of the board 82 can be reduced, thus a stable load can be added to the foot 61.

Further, although in the case in which only the rotating flame 71B is used, it is necessary to lengthen the frame 71B to some extent so as to reduce the rotational angle in order for absorbing the backlash of the foot 61, in the present embodiment, the backlash of the foot 61 can be absorbed by pressing the foot 61 from the above with the linearly moving frame 76B, and accordingly, the voltage detected by the voltage detection device 9 can be stabilized, thus the keystone distortion correction process can reliably and stably be performed without growing the interlocking device 7B in size.

Fourth Embodiment

Figure 14:
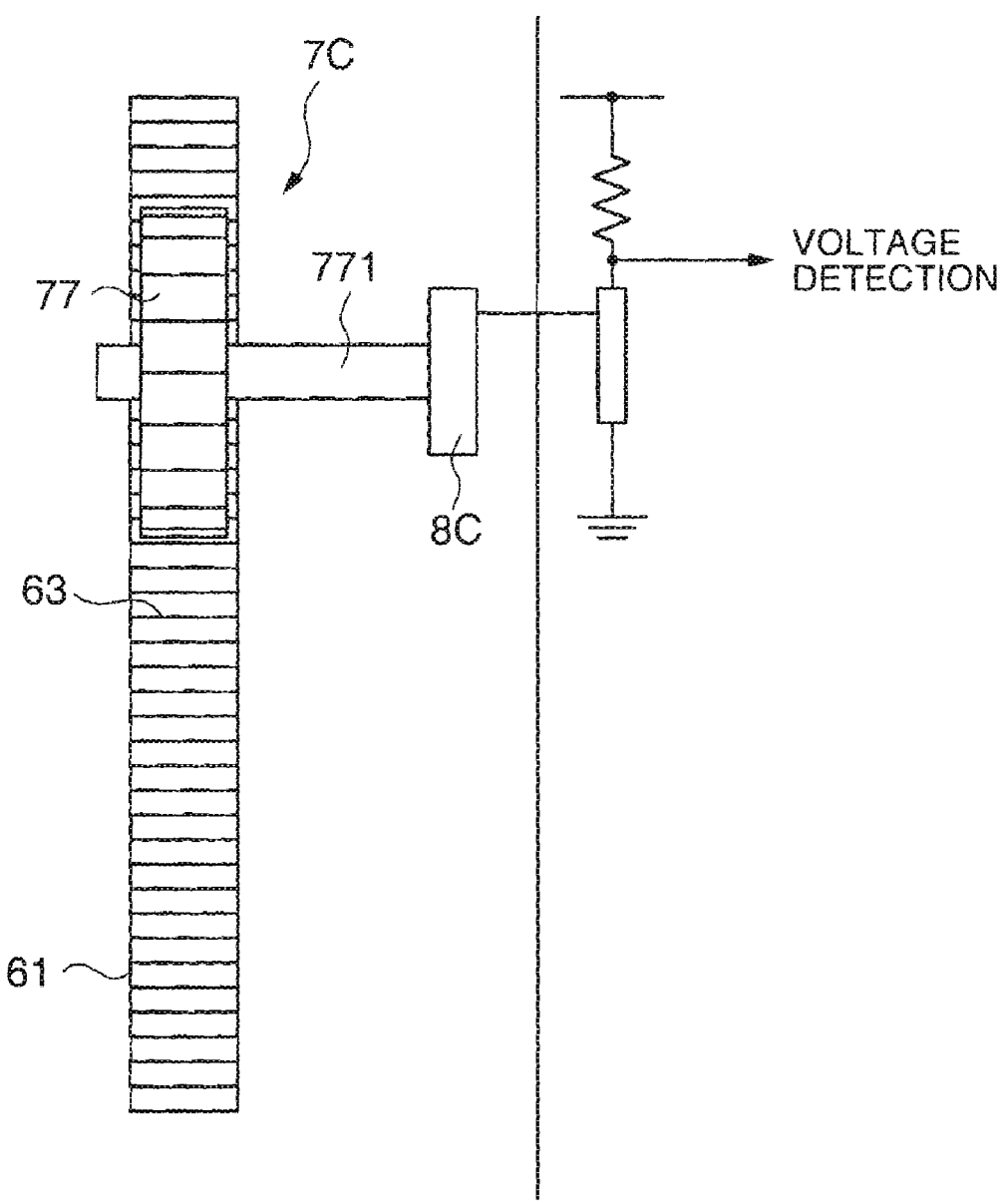
FIG. 14 is a diagram showing the schematic configuration of the interlocking device and the variable resistance device according to a fourth embodiment.
Figure 15:
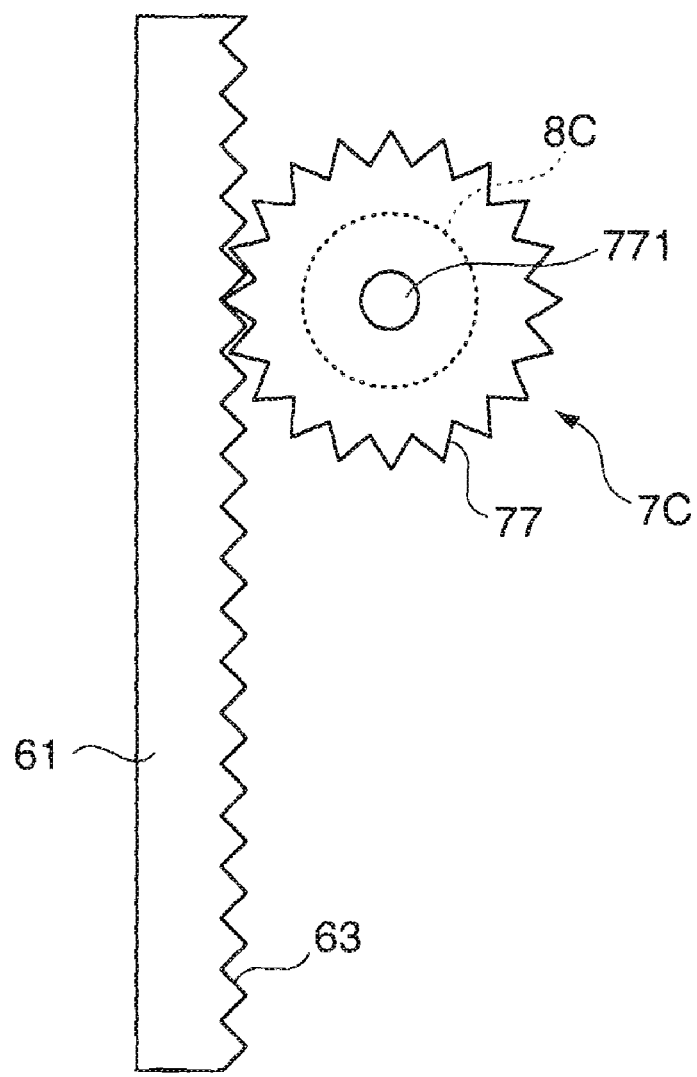
FIG. 15 is a diagram showing the schematic configuration of the interlocking device according to the fourth embodiment.

Hereinafter, a fourth exemplary embodiment will be explained with reference to FIGS. 14 and 15.

In the fourth embodiment, the side face of the foot 61 is provided with rack-like teeth 63 formed thereon, and a gear 77 meshing with the teeth 63 is provided as the interlocking device 7C. Further, a variable resistance device 8C formed of a common rotary variable resistor is attached to the rotary shaft 771 of the gear 77, thereby configuring so that the resistance varies in accordance with the rotation of the gear 77.

Also in the present embodiments since the voltage detected by the voltage detection device 9 varies as the resistance of the variable resistance device 8C varies in accordance with the movement of the foot 61, the position of the foot 61 can be detected with the voltage. Further, the keystone distortion correction section 521 performs the correction process with the keystone distortion correction amount in accordance with the voltage.

Even in such an embodiment, the similar functions and advantages can be obtained.

Further, although it is required to form the teeth 63 on the side face of the foot 61, since the interlocking device 7C can be configured with the gear 77, and further, a common rotary variable resistor can be used as the variable resistance device 8C, it can be configured at an extremely low price.

It should be noted that the invention is not limited to the embodiments described above but includes modifications and improvements in a range where the advantages of the invention can be achieved.

For example, although in the embodiments described above, the keystone distortion correction amount information has been stored in the keystone distortion correction amount information storage section 541 of the storage section 54 previously when the projector 1 has been manufactured, it is possible to configure that the user inputs or corrects the keystone distortion correction amount information by operating the keystone distortion correction operation section 21.

There are some cases with different conditions from the generally assumed condition according to the use environment of the user, such as for example, the screen Sc is at a slant from the vertical direction, or the area on which the projector 1 is installed is slightly tilted from the horizontal direction. Since the keystone distortion correction amount information stored when manufacturing the projector 1 is set in the typical condition, namely the screen Sc is set vertically, and the projector 1 is installed on a horizontal plane, in the case of different condition from this condition, there is a possibility that the correction is insufficient even if the protruding/retracting position of the foot 61 is figured out as the voltage, and performs the keystone distortion correction process with the keystone distortion correction amount corresponding to the voltage.

In such a case, the user should correct the keystone distortion by manually operating the keystone distortion correction operation section 21. Therefore, it is possible that the keystone distortion correction section 521 stores the correction amount performed by the manual operation in this case in the keystone distortion correction amount information storage section 541 so that the keystone distortion correction amount corresponding to the voltage can be corrected at and after the next time. According to such a configuration, there is an advantage that the keystone distortion correction process suitable for the use environment of each user can be performed, and the more precise correction can automatically be performed after the manual adjustment.

The interlocking devices 7 through 7C are not limited to be provided with the frames 71, 71B, 76, 76B, and the coil spring 72, but the interlocking device of joining the frame to the foot with a joint pin can also be used.

As the variable resistance devices 8, 8A, 8C, not only the configurations of the embodiments described above, but a common variable resistor whose resistance varies continuously by moving a sliding brush on the resistive element can also be used.

As the method of detecting the protruding/retracting position of the foot 61, the method of using the variable resistance device 8 and the voltage detection device 9, thus detecting the position with the variation in the voltage is not the limitation.

Figure 16:
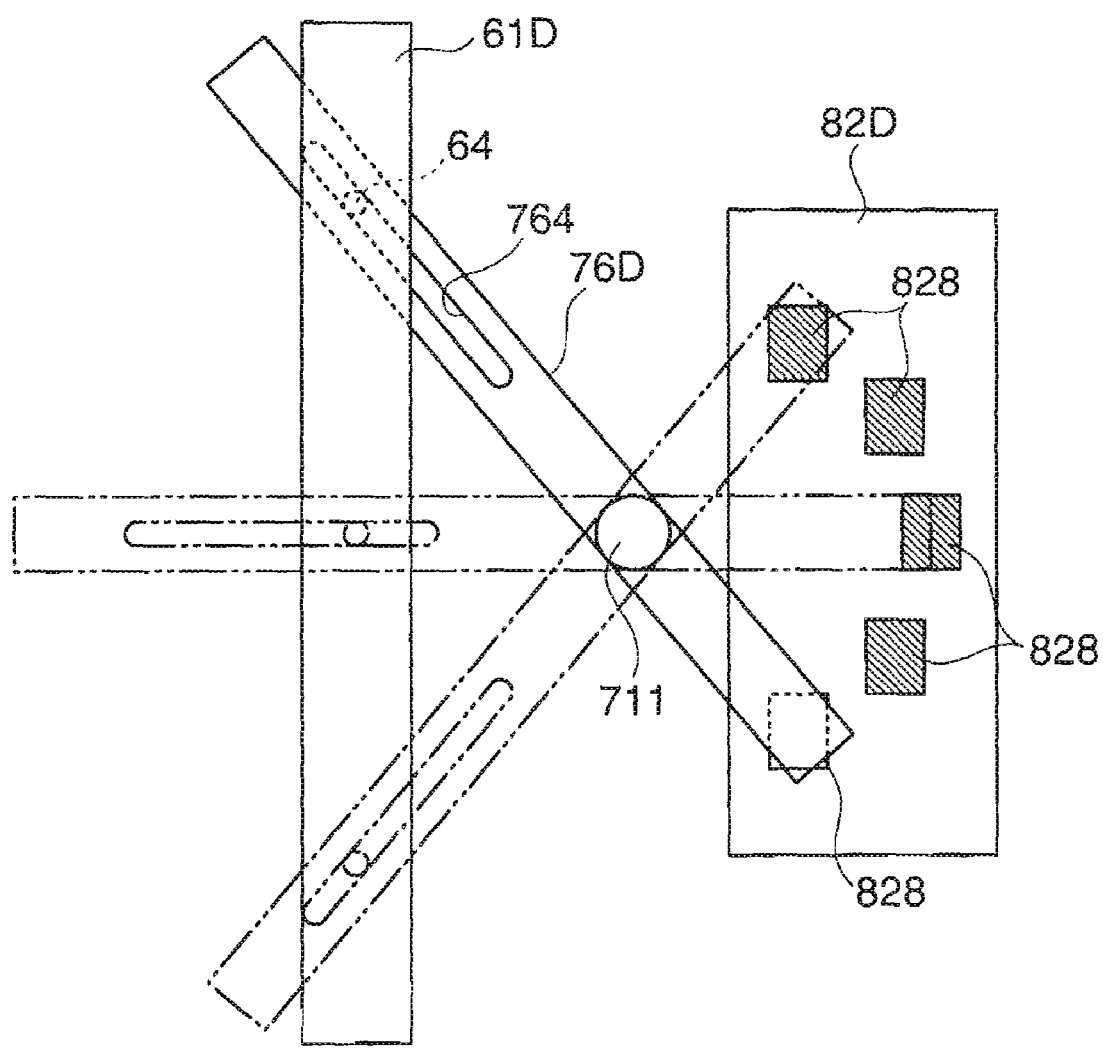
FIG. 16 is a diagram showing another example for detecting the protruding/retracting position of the adjusting leg section.

For example, it is possible that as shown in FIG. 16, a plurality of patterns 828 are disposed to form a circular are shape in the board 82D, the position of the foot 61D is detected by detecting which one of the patterns 828 has a contact with the end portion of the frame 76D rotating in conjunction with the protruding/retracting movement of the foot 61D, and thus setting the keystone distortion correction amount. It should be noted that in FIG. 16, in order for joining the linearly moving foot 61D and the frame 76D rotating around the pivot 711, it is configured that a pin 64 is provided to the foot 61D, a guide groove 764 for guiding the pin 64 is provided to the frame 76D, thus the frame 76D moves in conjunction with the movement of the foot 61D without using the coil spring 72.

Figure 17:
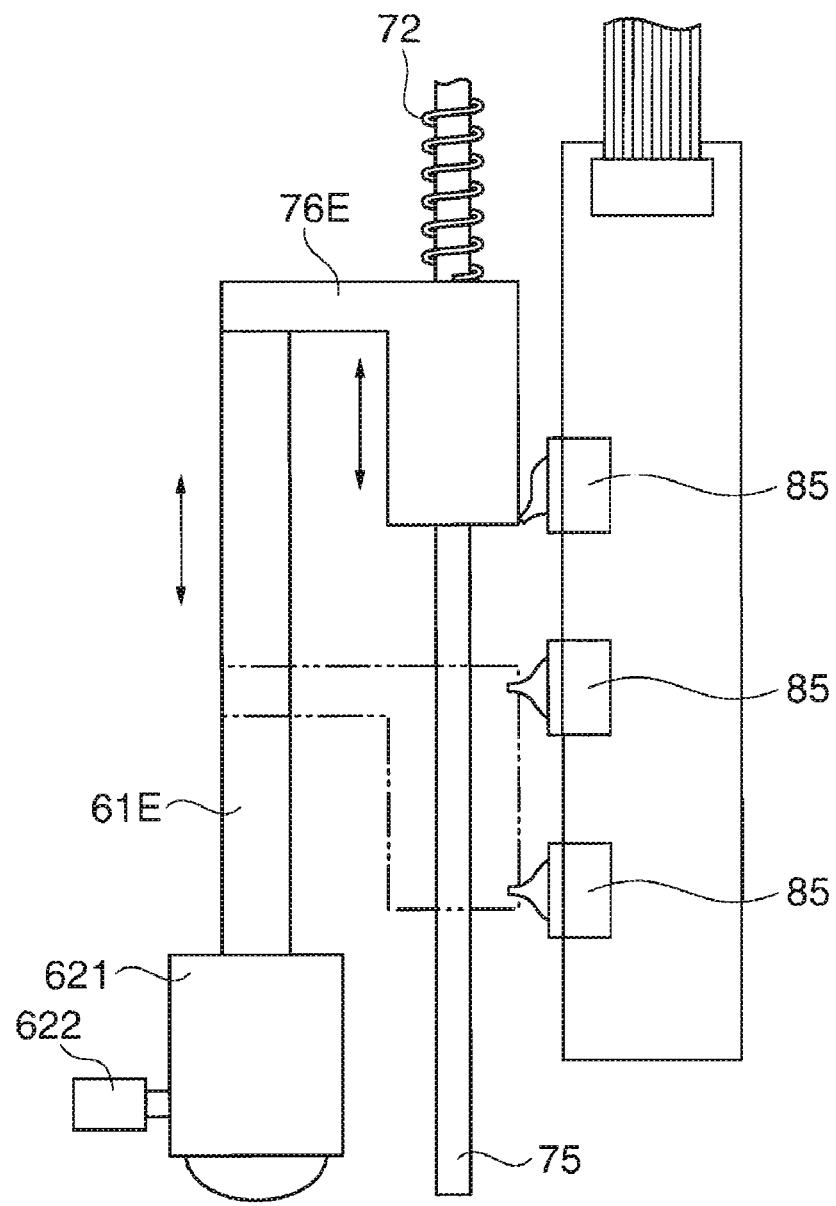
FIG. 17 is a diagram showing another example for detecting the protruding/retracting position of the adjusting leg section.

Further, as shown in FIG. 17, it is possible that a plurality of lever switches 85 are disposed along the moving direction of the frame 76E moving in conjunction with the foot 61E, the position of the foot 61E can be detected by which one of the lever switches 85 is input in conjunction with the movement of the frame 76E.

Although the liquid crystal light valve is used as the optical modulation device in the projector 1 in each of the embodiment, an optical modulation device other than the liquid crystal based devices such as a device using micromirror can also be adopted.

Although the most preferable configurations for putting the invention into practice and so on are disclosed in the above descriptions, the invention is not limited thereto. In other words, although the invention is particularly illustrated and described with respect mainly to a specific embodiment, those skilled in the art can apply various modifications to the embodiment described above in detailed configurations such as shapes, materials, quantity, and so on within the scope, the spirit, the technical concepts, or the object of the invention.

Accordingly, the descriptions limiting the shapes, the materials, and so on are provided as exemplification only for easier understanding of the invention, but not for limiting the invention. Therefore, descriptions with the names of the elements with a part or all of the limitations such as a shape or a material removed therefrom are included in the invention.

Since the projector according to the exemplary embodiments of the invention can perform the keystone distortion correction of an image displayed on the screen automatically and at a low price, the projector is useful as a low price and popularization model of projector used for a presentation purpose or a home theater.

What is claimed is:

1. A projector that projects an image including keystone distortion, the projector comprising:
    a first conductive pattern electrically connected to a first terminal section;
    a second conductive pattern electrically connected to a second terminal section, the second conductive pattern being divided into a plurality of contact areas, the plurality of contact areas being separated from each other by insulated areas that are diagonally oriented with respect to a moving direction of a contact portion, the contact portion comprises two or more contact reeds;
    an adjusting leg section that changes a tilt condition in a vertical direction of the projector by protruding or retracting, the adjusting leg section including the contact portion that makes contact with at least one of the plurality of contact areas;
    a voltage detection device that determines a position of the adjusting leg section by detecting a voltage between the first terminal section and the second terminal section based on the contact area contacted by the contact portion; and
    a keystone distortion correction section that automatically corrects the keystone distortion of the projected image.

2. The projector according to claim 1, the keystone distortion correction section automatically correcting the keystone distortion of the projected image by retrieving keystone distortion correction amount information corresponding to the position of the adjusting leg section, the keystone distortion correction amount information being stored in a storage section before the projector projects the image.

* * * * *